US012782945B2

(12) United States Patent
Govil et al.

(10) Patent No.: US 12,782,945 B2
(45) Date of Patent: Nov. 3, 2026

(54) MOBILITY DEVICE NAVIGATION AND CONTROL THROUGH A NON-INVASIVE BRAIN-COMPUTER INTERFACE

(71) Applicant: Synaptrix Labs Inc., New York, NY (US)

(72) Inventors: Aryan Govil, New York, NY (US); Eric Yao, New York, NY (US); Ojas Karnavat, Santa Clara, CA (US); Raghav Katoch, New York, NY (US); Rishi Arjun, San Jose, CA (US); Amir Ghaedi, Aliso Viejo, CA (US); Mihir Bharti, San Ramon, CA (US)

(73) Assignee: Synaptrix Labs Inc., New York, NY (US)

( * ) Notice: Subject to any disclaimer, the term of this patent is extended or adjusted under 35 U.S.C. 154(b) by 207 days.

(21) Appl. No.: 18/764,674

(22) Filed: Jul. 5, 2024

(65) Prior Publication Data

US 2025/0370451 A1 Dec. 4, 2025

Related U.S. Application Data

(60) Provisional application No. 63/653,565, filed on May 30, 2024.

(51) Int. Cl.
*G05D 1/223* (2024.01)
*G05D 1/224* (2024.01)
(Continued)

(52) U.S. Cl.
CPC ......... *G05D 1/2234* (2024.01); *G05D 1/2244* (2024.01); *G06F 3/015* (2013.01); *G05D 2101/15* (2024.01); *G05D 2105/24* (2024.01)

(58) Field of Classification Search
None
See application file for complete search history.

(56) References Cited

U.S. PATENT DOCUMENTS

2016/0282940 A1* 9/2016 Hong ...................... G06F 3/015
2018/0148007 A1* 5/2018 Gage .................... B60N 2/0248

FOREIGN PATENT DOCUMENTS

CN 107714331 A * 2/2018 ............. G06F 3/015
CN 104503580 B * 4/2018 ............. G06F 3/015

OTHER PUBLICATIONS

Chen et al. (An Electric Wheelchair Manipulating System Using SSVEP-Based BCI System, Biosensors 2022, 12, 772) (Year: 2022).*

(Continued)

*Primary Examiner* — Jay B Shah
(74) *Attorney, Agent, or Firm* — Rimon PC

(57) ABSTRACT

The present application discloses methods and systems for mobility device control by capturing electroencephalogram (EEG) brain wave data to extract steady-state visually evoked potential (SSVEP) signal data and decoding the SSVEP signal data into at least one command for controlling the mobility device. The SSVEP signals are triggered through visual stimuli on a screen of a device, such as a user device, and are decoded through a machine learning pipeline. At least one of cloud, edge or fog principles may be utilized to enhance response time. The use of the machine learning pipeline and at least one of cloud, edge or fog technology provides an improved mobility device control system response time when compared to the current and prior alternatives for mobility device control systems.

20 Claims, 8 Drawing Sheets

(51) Int. Cl.

| | |
|---|---|
| ***G05D 101/15*** | (2024.01) |
| ***G05D 105/22*** | (2024.01) |
| ***G06F 3/01*** | (2006.01) |

(56) References Cited

OTHER PUBLICATIONS

Siribunyaphat et al. Brain-Computer Interface Based on Steady-State Visual Evoked Potential Using Quick-Response Code Pattern for Wheelchair Control Sensors 2023, 23, 2069. https://doi.org/10.3390/s23042069 (Year: 2023).*

Mistry et al. 2018 IEEE International Instrumentation and Measurement Technology Conference (I2MTC) (Year: 2018).*

* cited by examiner

MOBILITY DEVICE NAVIGATION AND CONTROL THROUGH A NON-INVASIVE BRAIN-COMPUTER INTERFACE

FIELD OF THE TECHNOLOGY

The present disclosure generally relates to electroencephalogram (EEG) mobility device control technology, and more specifically, to systems and methods for controlling a mobility device based on steady-state visually evoked potential (SSVEP) signal data processed through a machine learning pipeline.

BACKGROUND

People all over the world are living with neuromuscular conditions, such as, paralysis, amyotrophic lateral sclerosis (ALS), and muscular dystrophy. Many suffering from these conditions, as well as others, have lost at least some degree of their mobility and independence, resulting in an increased reliance on mobility devices. A powered mobility device helps a user of such a device to regain a freedom of mobility by allowing the user to control the mobility device's operations (for example, through a joystick to make the mobility device move from a Location A to a Location B). The powered mobility device can also be controlled by the user to perform non-movement related functions, for example, adjusting a tilt of the mobility device's seat.

The terms "mobility device" and "powered mobility device" are used synonymously in this application, and such devices comprise powered wheelchairs, powered scooters, powered golf carts, powered bikes, e-skateboards, power stair and other types of lifts, and the like. The efficacy of the mobility device depends on user control mechanisms, however, existing mobility device control mechanisms are inadequate. Therefore, solutions for improved mobility device control are urgently needed.

SUMMARY

Joystick type mobility device control mechanisms are an inadequate mobility device control solution in many cases, such as when a user is unable to operate the joystick. Attempts to address the need for non-joystick type mobility device control have so far been inadequate, such as the case with computer vision systems.

While striving to enhance mobility, current and prior computer vision mobility device control systems prove uncomfortable during prolonged use, due to, among other things, the placement of a relatively large device in front of a user's face to track the user's eye movements. Furthermore, because such systems depend on a camera to detect the user's eye movements, they are vulnerable to failure in varying lighting conditions. The infrared (IR) cameras integral to these technologies can also cause dryness and itchiness in the eyes of the very individuals they aim to assist. Beyond mere discomfort, the conspicuous nature of these types of systems increases the challenges facing users of these systems. Bulky cameras and screens diminish social discretion, a potential consequence of which can include feelings of embarrassment when navigating public spaces.

The current and prior non-joystick type alternative mobility device control mechanisms in the form of brain-computer interfaces (BCIs) are inadequate. Many current and prior BCI based control mechanisms utilize invasive BCIs, meaning that users of such systems are required to undergo surgery to receive brain implants. This poses a collective challenge to adoption of such control mechanisms, since many are reluctant towards neurosurgery, and since no surgery is risk-free to the patient, prompting the need for less invasive, safer, non-surgical mobility device control mechanisms.

Recognizing this, there has been some interest in non-invasive approaches that focus on EEG related accessibility devices. However, current and prior EEG based control mechanisms rely on cumbersome EEG nets and skull caps. The intrusive multi-sensor arrays employed in these headset designs hinders practicality in real-world scenarios, restricting the broader applicability of this promising technology. Another limitation of current and prior EEG and BCI based control mechanisms, is a suboptimal response time between when the user intends a command to occur and when the command is actually performed. Therefore, there is an urgent need for a mobility device control mechanism that can overcome the problems and limitations of the control mechanisms discussed above.

Technically improved mobility device control methods and systems are provided. This application describes a compact and discrete EEG headband. When worn by the user and activated, the EEG headband receives brain wave data from the occipital lobe of the user's brain, via EEG sensors on the EEG headband positioned at strategic areas of the user's back of the head. SSVEP signals are triggered by visual stimuli on a screen of a device, such as a user device. SSVEP signal data is extracted from the brain wave data and is decoded through a machine learning pipeline into at least one command used to operate a mobility device. The use of the machine learning pipeline improves the mobility device control system's response time when compared to the current and prior mobility device control systems, and therefore the mobility device control mechanisms described in this application are an improvement over current and prior mobility device control systems.

In some embodiments, the machine learning pipeline is comprised of at least an electrical de-noising step, a spatial de-noising step, a muscle artifacts removal step, an end-to-end neural network step, a recalibration model step, and a hyperparameter fine tuning step. These steps may be performed via at least one module. In some embodiments, modules are software code or instructions, where such code or instructions are stored on a non-transitory computer-readable medium, where when such code or instructions are executed by at least one processor, cause performance of the corresponding at least one step described above. For example, an electrical de-noising module may be code or instructions stored on a memory, where when the code or instructions are executed by a processor, the step of electrical de-noising is performed.

In some embodiments, cloud, edge and/or fog technology is utilized in parallel with a user device, to at least one of: process the captured brain wave data, optimize algorithms or models, or transmit any data necessary for operating the mobility device or updating the models or algorithms utilized for operating the mobility device. This further improves the response times by offloading steps that are too resource intensive for a device (such as a user device) to the cloud/edge/fog node(s), thereby conserving resources on the user device (a resource intensive step can be a step that consumes an inordinate amount of processing or memory/storage resources).

After the SSVEP signal data is decoded into the at least one command, the at least one command is forwarded to the mobility device, or relayed to the user device to forward to the mobility device, to operate the mobility device. The at least one command may cause the mobility device to move in a direction. The at least one command may cause the mobility device to adjust a tilt of a mobility device seat, adjust a height of the mobility device, adjust a leg rest of the mobility device, adjust an arm rest of the mobility device, and the like.

A user may save mobility device configurations, including a seat position, a backrest angle, a footrest height, and other adjustable parameters as a preset. The user may later access and activate a mobility device configuration via a graphical user interface (GUI) of an application on a user device, allowing for a quick recall of the user's preferred settings, tailored to specific activities and/or environments. Some or all of the user-defined presets may be stored in the user device, and/or, some or all the user-defined presets may be stored in a cloud/edge/fog node(s), enabling the user to access and switch between configurations through a user interface (for example, a GUI including labeled buttons, a touchscreen menu, and the like). Feedback in the form of status information may also be provided through the GUI.

A main machine learning algorithm is provided. The main machine learning algorithm is a mixture of experts (MoE) artificial intelligence (AI) model, and is comprised of one main end-to-end neural network combined with smaller optimization models. The main machine learning algorithm can be personalized to the user by utilizing, among other things, an evolving user profile. The user profile is generated based on captured and collected data, and describes, among other things, user capabilities. By continuously gathering and analyzing data from the sensors on the EEG headband, other sensors, as well as the user inputs, the main machine learning algorithm adapts to the specific needs, preferences, and abilities of the individual. Over time, the main machine learning algorithm builds a comprehensive user profile that enables it to anticipate and respond to the user's inputs dynamically.

Furthermore, the main machine learning algorithm can identify and learn from successful user-initiated configurations, thereby increasing its accuracy in determining the user's intent (for example, correctly determining that the user wants the mobility device to move in a certain direction) and providing a more intuitive and personalized experience. By constantly evolving in sync with the user, the main machine learning algorithm becomes an extension of the user, enhancing independence, safety, and comfort.

BRIEF DESCRIPTION OF THE DRAWINGS

Features of the present disclosure will become readily apparent upon further review of the following specification and drawings. In the drawings, like reference numerals designate corresponding parts/devices throughout the views. Moreover, components in the drawings are not necessarily drawn to scale, the emphasis instead being placed upon clearly illustrating the principles of the present disclosure. Furthermore, embodiments of this application can be freely combined with each other and aspects or steps of one embodiment can be freely introduced into another embodiment.

DETAILED DESCRIPTION

Embodiments of the disclosure are described more fully hereinafter with reference to the accompanying drawings, in which some embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
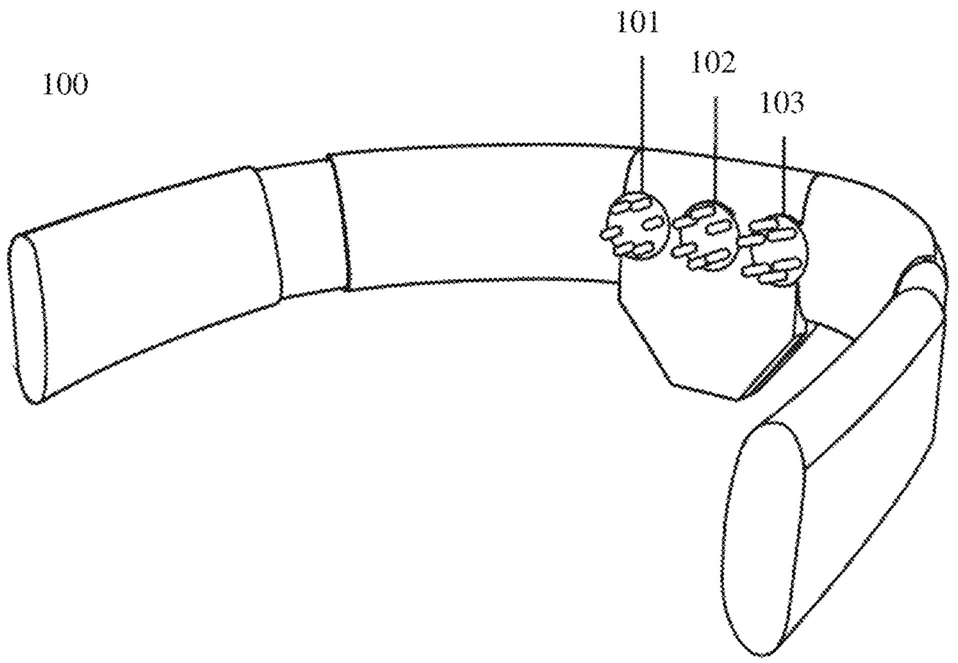
FIG. 1 is an illustration of a first view of an EEG headband in some embodiments of this application.

FIG. 1 illustrates an EEG headband 100 in some embodiments. The EEG headband 100 has a lightweight construction due to its shape, its composition from lightweight materials (such as polycarbonate, carbon fiber, etc.), as well as to the employment of a limited number of dry sensors on the EEG headband 100 (three sensors are illustrated in FIG. 1). Utilizing a reduced number of sensors, at specific locations of the back of the head, allows for capturing robust signal data essential to achieving nimble mobility device control, while at the same time maximizing comfort by reducing the size and weight of the EEG headband 100.

In some embodiments, such as the one illustrated in FIG. 1, the EEG headband 100 is comprised of three dry sensors 101, 102 and 103. These dry sensors are placed at the back of the head, targeting the O1, Oz and O2 locations of the occipital lobe (see FIG. 4 for illustration of the O1, Oz and O2 locations). When the EEG headband is activated and worn by the user, the dry sensors capture brain wave data from the occipital lobe. The occipital lobe is located at the back of the head and is the part of the human brain that is responsible for processing of visual data from the eyes.

SSVEP signals are extracted from the brain wave data and the SSVEP signals are decoded through a machine learning pipeline into at least one command to operate a mobility device. SSVEP signals are EEG signals that are triggered by visual stimuli. The visual stimuli may be on a screen of a device. For example, when a user of the EEG headband 100 who is wearing the EEG headband 100 looks at a certain portion of a screen on a device, such as a user device, generated visual stimuli on that screen elicit the SSVEP signals, which are captured and decoded into a at least one command for operation of the mobility device.

In some embodiments (not illustrated in FIG. 1), more than three sensors may be used. In some embodiments (not illustrated in FIG. 1), only two sensors may be used, where those sensors may be placed at the O1 and O2 locations at the back of the head (see FIG. 4 for illustration of the O1 and O2 locations). In some embodiments, the dry sensors are gold plated and do not need addition of any saline solution to improve conductance. However, one of ordinary skill in the art would appreciate that wet sensors, utilizing a solution to enhance conductivity, could also be used.

Figure 2:
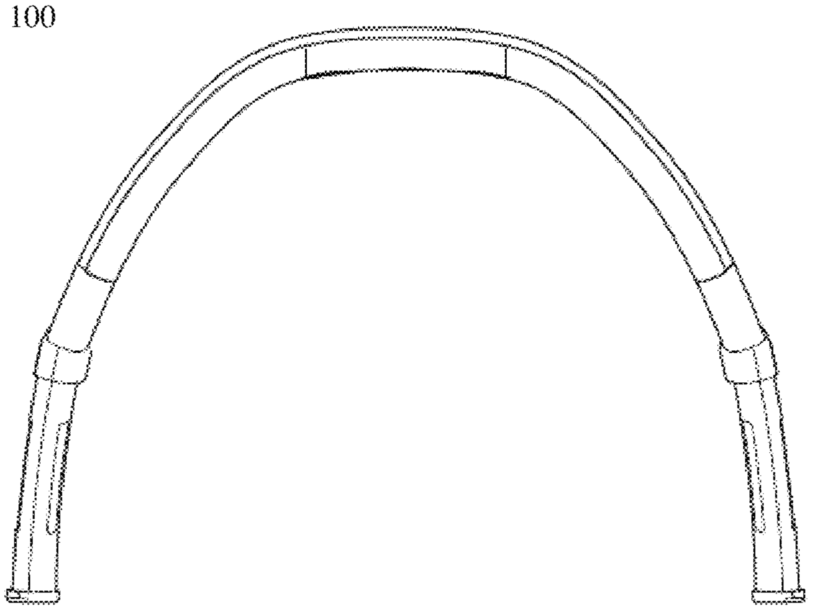
FIG. 2 is an illustration of a second view of an EEG headband in some embodiments of this application.

FIG. 2 is an illustration of a second view of an EEG headband 100 in some embodiments of this application. The EEG sensors, such as sensors 101, 102 and 103 in FIG. 1, can be detachable (for example, the EEG sensors can snap on and off the EEG headband 100). FIG. 2 illustrates just the EEG headband, without the EEG sensors.

Figure 3:
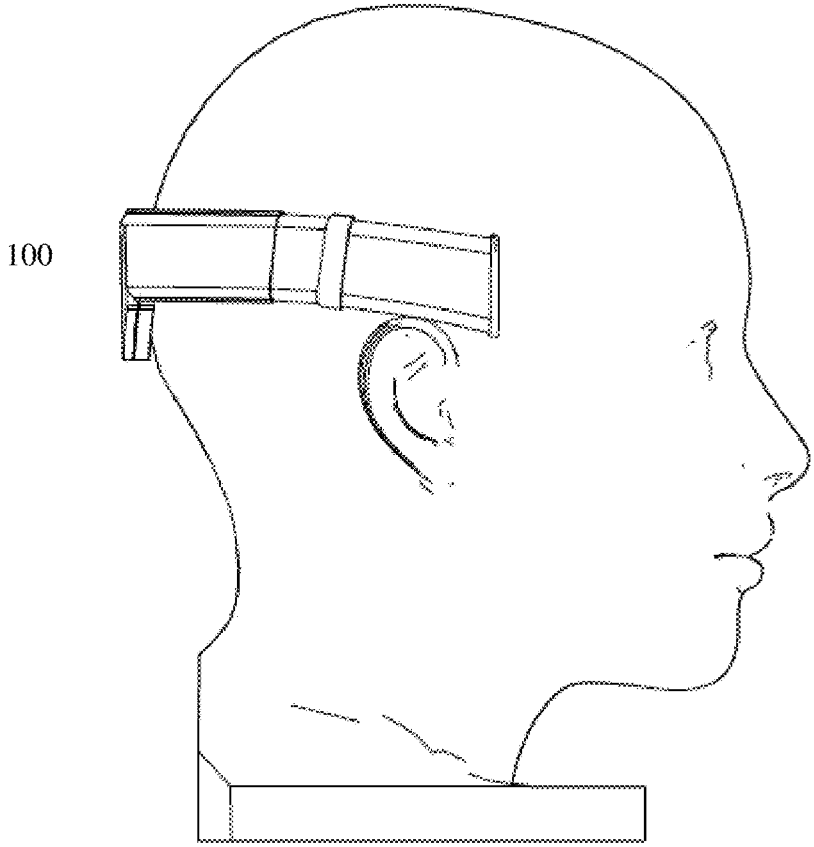
FIG. 3 is an illustration of an EEG headband on a user's head in some embodiments of this application.

FIG. 3 is an illustration of the EEG headband 100 worn on a user's head, in some embodiments of this application. As shown in FIG. 3, the EEG sensors of the EEG headband 100 target the back of the user's head. In embodiments where the EEG headband has three sensors (such as in FIG. 1), those sensors target the O1, Oz and O2 locations at the back of the head (see FIG. 4 for illustration of the O1, Oz and O2 locations). In embodiments where the EEG headband has two sensors, those sensors target the O1 and O2 locations at the back of the head (see FIG. 4 for illustration of the O1 and O2 locations).

Figure 4:
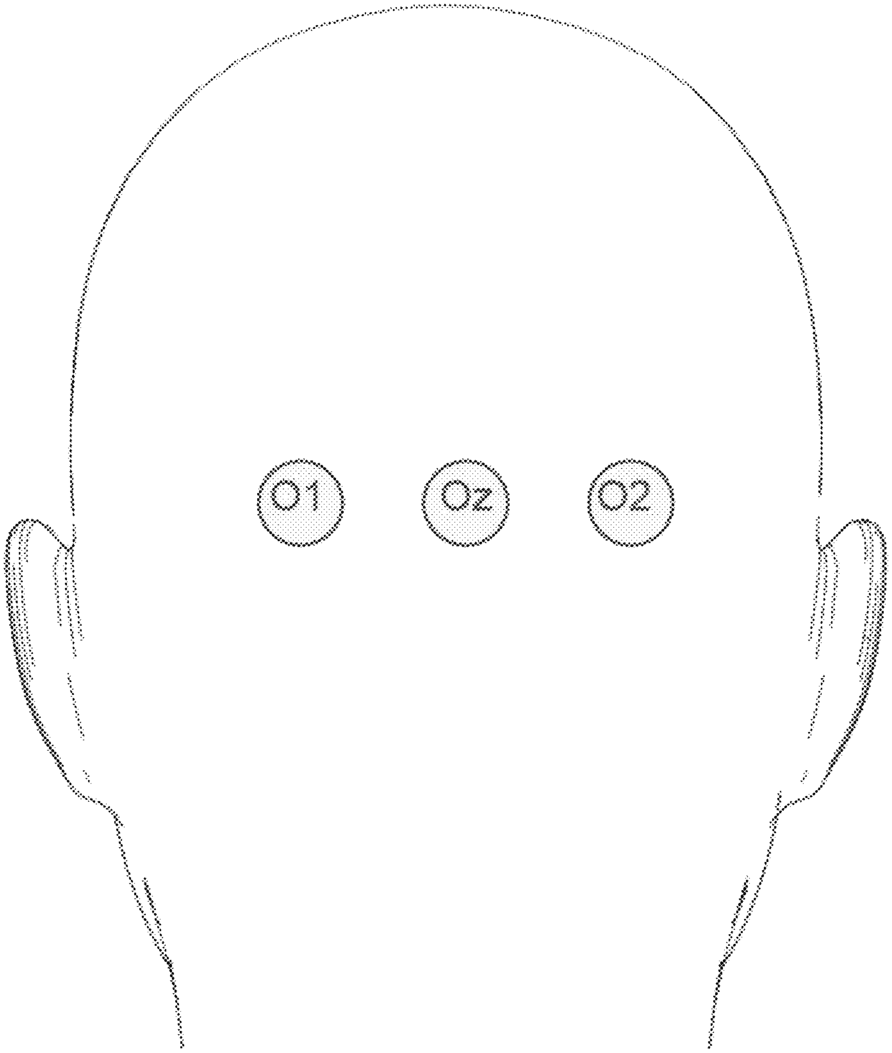
FIG. 4 is an illustration of the O1, Oz and O2 locations at the back of a user's head that correspond to the placement locations of the sensors on the EEG headband when worn by the user, in some embodiments of this application.

FIG. 4 shows the O1, Oz, and O2 locations at the back of the head. These locations correspond to the positions of the EEG sensors. For example, in embodiments where the EEG headband has three sensors, such as sensors 101, 102 and 103 in FIG. 1, when that EEG headband is activated and worn by a user, sensor 101 will capture brain wave data from the O2 location, sensor 102 will capture brain wave data from the Oz location, and sensor 103 will capture brain wave data from the O1 location.

As previously explained, prior and current BCI and EEG control mechanisms suffer from poor response times. In embodiments, at least one of cloud, edge, or fog computing technologies may be utilized in conjunction with a user device for any necessary processing, configuring, storing, analyzing and/or forwarding, to ensure optimal response times. Edge computing technology in this application refers, at a general level, to the processing, storing, configuring, analyzing and/or forwarding of relevant data, commands, models, and/or algorithms at/from/by an edge node(s) positioned at locations closer to the user device.

Edge nodes can include, for example, internet of things (IoT) devices, other user devices, and the like. Devices that are referred to as edge nodes in this application may also be considered fog nodes. This application does not limit any of the nodes or devices to any specific devices. The use of edge technology enhances response times over the use of cloud computing technology because data is located closer to the user devices in edge computing than in cloud computing, and therefore, the data travels a shorter distance before reaching its intended destination.

Fog technology in this application is utilized in similar ways to edge technology, also for processing, storing, configuring, analyzing and/or forwarding of relevant data, commands, models, and/or algorithms at/from/by locations closer to the user device. These location in fog technology may be referred to as fog nodes. Fog nodes are located at a layer between cloud nodes and edge nodes, so that they are closer to the user device than cloud nodes, but farther from the user devices than edge nodes.

Fog nodes can include base stations (such as a gNB), gateways, access points, routers, set-top boxes, and the like. Devices that are referred to as fog nodes in this application may also be considered edge nodes. In some embodiments, cloud, edge and fog computing technologies can be utilized together. In some embodiments, cloud and edge technologies can be utilized together. In some embodiments, cloud and fog technologies can be utilized together. In some embodiments, edge and fog technologies can be utilized together. In some embodiments, either cloud, edge or fog computing could be separately utilized.

Figure 5:
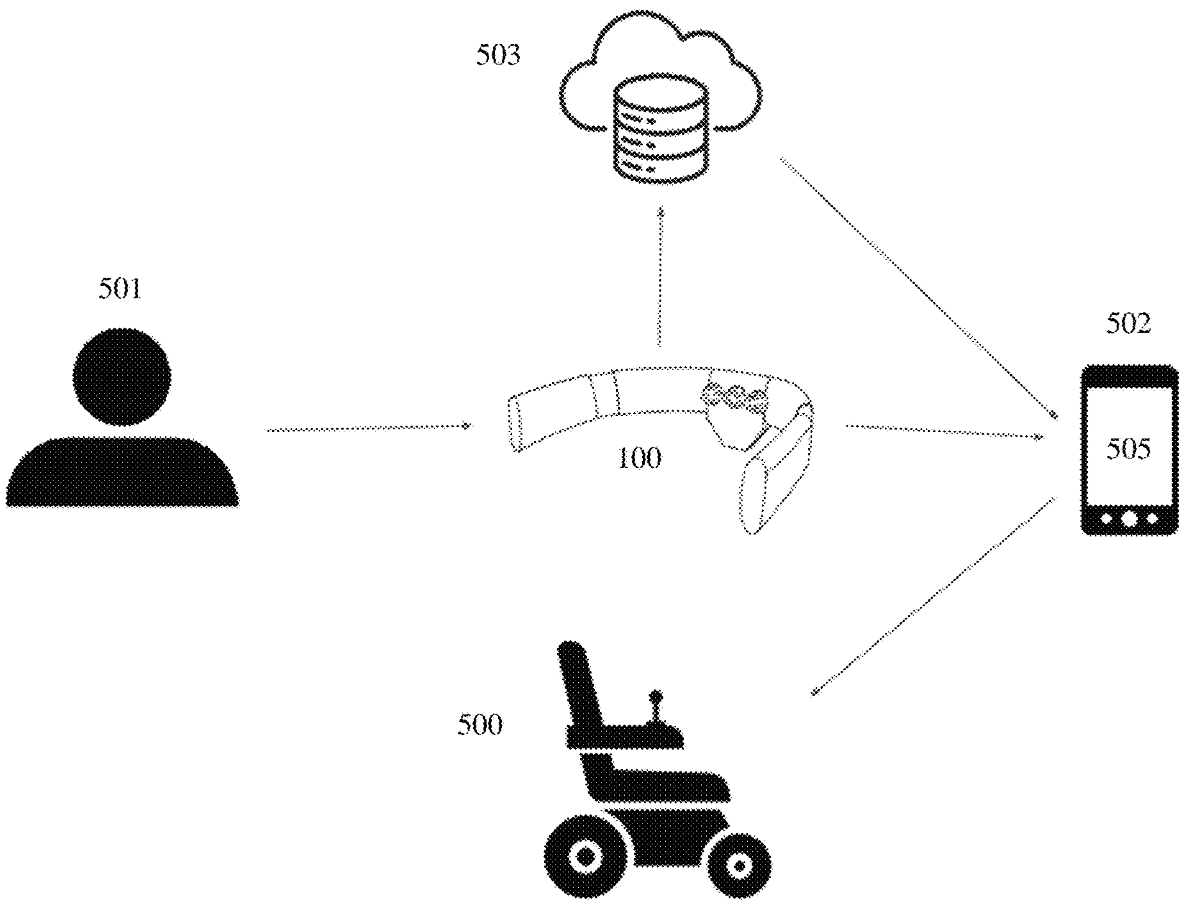
FIG. 5 is a schematic of the environment in embodiments of this application.

FIG. 5 is an illustration of the environment in embodiments of this application, and shows the flow of data relayed from the EEG headband 100. The EEG headband 100 is mainly a data acquisition apparatus, and therefore most of the data processing occurs either at the cloud/edge/fog node(s) or the user device. In some embodiments, brain wave data obtained by the EEG headband 100 is transferred from the EEG headband 100 to both the user device and the cloud/edge/fog node(s), and a small model is used to determine where the processing occurs. The more processing intensive steps, such as those performed by the end-to-end neural network (also referred to in this application as a main end-to-end neural network), are run on the cloud/edge/fog node(s), while the less processing intensive steps, such as those related to an emergency stop operation, other safety operations, or to a hyperparameter finetuning layer, are run on the user device.

As shown in FIG. 5, after the EEG headband 100 captures brain wave data from the occipital lobe of user 501 via EEG sensors on the EEG headband 100, the captured brain wave data is relayed from the EEG headband 100 and processed. In some embodiments, the EEG headband 100 may relay some or all of the captured brain wave data to the user device 502 to be processed, and/or the EEG headband 100 may relay some or all of the captured brain wave data to a secure cloud, edge or fog node 503 for additional and advanced computational processing.

The secure cloud, edge or fog node 503 may be a single node or may be a plurality of nodes that utilize at least one of cloud, edge or fog technology. The secure cloud, edge or fog node 503 may be a server, a data center, a base station (such as an eNB, NodeB, gNB, and the like), an IoT device, an access point (AP), a gateway, a router, and the like. The data in FIG. 5 is relayed via any wireless or wired protocols and technology, for example Bluetooth, Bluetooth Low Energy, near filed communication, Wi-Fi, Ethernet, cellular protocols (5G, LTE, 4G, 3G), RS232 serial communication protocol, and the like.

The secure cloud, edge or fog node 503 is secured via authentication and/or encryption mechanisms. For example, end-to-end asymmetric encryption may be used to transfer data to and from the secure cloud, edge or fog node 503, so that the data cannot be tampered with or read by any third parties. Authentication may be utilized to verify entities' identities and ensure that entities that are communicating or receiving the data are who they claim to be. Authentication and encryption mechanisms in this disclosure are not limited to being between the EEG headband 100 and the secure cloud, edge or fog node 503, or between the secure cloud, edge or fog node 503 and user device 502, but also can be used between other devices, such as between the user device 502 and the mobility device 500 and between the EEG headband 100 and the user device 502.

The secure cloud, edge or fog node 503 may receive brain wave data from the EEG headband 100, process it, and then relay data or a command to the user device 502. For example, the secure cloud, edge or fog node 503 may process the brain wave data to output at least one command meant for a mobility device 500, and then relay the at least command to user device 502, where the user device 502 then relays the at least one command to the mobility device 500.

The secure cloud, edge or fog node 503 may also process the brain wave data it receives from the EEG headband 100 to feed a main machine learning algorithm. The main machine learning algorithm is an MOE AI model that is comprised of one end-to-end neural network combined with smaller optimization models. The main machine learning algorithm continuously receives and analyzes data from the EEG sensors on the EEG headband 100, as well as other sensors and inputs, to generate and update a user profile and to output commands for the mobility device.

Each user's profile is unique, and stores data about that specific user, such as the user's capabilities. The main machine learning algorithm can be personalized based on the detected user capabilities and other information in the user profile. The user profile dynamically evolves as additional information about the user is gathered. Over time, a comprehensive user profile is built, that enables the main machine learning algorithm to anticipate and respond to the user's inputs dynamically. The user's profile is kept encrypted and/or in a secure location in at least one of user device(s), cloud node(s), edge node(s), or fog node(s). The user profile is used to dynamically fine tune algorithms and models to the particular user based on that user's brain activity. For example, user profile data may be used to train a small optimization model, specific to that user, using that user's data.

The main machine learning algorithm can also identify and learn from successful user-initiated configurations (such as correctly determining that the user intended the mobility device to move in a certain direction), thereby increasing its accuracy in determining the user's intent. A user-initiated configuration is deemed successful by analyzing captured data according to a threshold-based model and determining that a threshold is exceeded. The threshold for the threshold-based model may be set by a machine learning algorithm. The data analyzed to determine whether a user-initiated configuration is successful may comprise electrode conductivity and user skin resistance measurements. These types of measurements may be dynamically obtained to verify the quality of the captured EEG data and to determine the accuracy of the system.

The main machine learning algorithm comprises a main end-to-end neural network, which may be hosted on the secure cloud, edge or fog node 503 because of its resource intensive nature (e.g., processing, memory resources). The main end-to-end neural network is responsible for processing EEG inputs from the EEG headband 100 the user's head and outputting signals for controlling the mobility device. The main machine learning algorithm also comprises smaller optimization models that are utilized for, among other things, ensuring safety, and for double checking the main neural network to confirm that the operation the user intends the mobility device perform corresponds to the operation that is output from the main neural network. Thresholds may be used to determine if a user command should be executed, for example, EEG data may be analyzed to determine if a confirmation threshold for an order is met, and if it is, that order is executed.

The user device 502 may process the data that it receives from the EEG headband 100 and the data that it receives from the secure cloud, edge or fog node 503 (the user device 502 may also receive a command to forward to the mobility device 500 from the secure cloud, edge or fog node 503), and transmits a command to the mobility device 500 to operate the mobility device 500.

The user device 502 may be any device that is configured to receive, process or transmit data on a user side, such as a smart phone, a tablet, a smart watch, a laptop, a computer, and the like. Application 505 executes on the user device 502 and serves as an intuitive central hub for, among other things, calibration settings, status information, saved mobility device configurations and destination selections.

Calibration settings allow a user to recalibrate the system if it is determined that a machine learning model and/or algorithm is not in tune with the user. In some embodiments, the application 505 may notify the user that recalibration needs to occur, and the recalibration may be initiated automatically, without any user input.

Feedback in the form of status information is provided through the GUI of the application 505. The main screen of the GUI can display status information, such as, a battery level indicator showing the remaining charge of the mobility device battery (for example, as a percentage and/or an estimated runtime). The status information may also include a visual representation of the mobility device's current configuration, for example, highlighting the position of the seat, backrest, footrests, and any other adjustable components. The status information can also include the mobility device's speed, the distance traveled by the mobility device, and the driving mode information (e.g., indoor, outdoor, or custom).

The status information can also indicate a connectivity status. Good connectivity of the EEG sensors is important for the accurate functioning of the mobility device control system and machine learning components. Live data regarding connectivity and associated resistance of EEG sensors may be captured and displayed through the GUI. The status information can furthermore include any detected issues, maintenance alerts, or notifications, for example, the GUI may display a low tire pressure indicator or an upcoming service reminder. Important status information is prominently displayed on the GUI, for example, in bold, to ensure conspicuousness and safety.

A user may save mobility device configurations, including a seat position, a backrest angle, a footrest height, and other adjustable parameters as a preset in the application 505. The user may later access and activate a mobility device configuration via the GUI of application 505, allowing for a quick recall of the user's preferred settings, tailored to specific activities and/or environments. Some or all of the user-defined presets may be stored in the user device 502, and/or, some or all of the user-defined presets may be stored in the secure cloud, edge or fog node 503. The GUI may include labeled buttons, a touchscreen menu, and the like.

The GUI of application 505 streamlines destination selections (selecting icons on a screen, such as an arrow, which correspond to an operation of the mobility device, such as a movement of the mobility device in a direction) through a visual click-based protocol. The visual click-based protocol comprises the user looking at a portion of a screen, such as an icon (for example a right arrow), having the user's brain waves captured and processed, and determining which icon the user was looking at based on the processed brain wave data. A command can then be issued to the mobility device based on the processed brain wave data. When the user looks at a certain portion of the screen, the necessary neural activations are triggered in the user's brain, which when processed according to this disclosure, allow for navigation and control of the mobility device.

The machine learning pipeline for EEG brain wave data decoding and user intent identification (determining what the user intends the mobility device do) strategically runs certain latency-sensitive steps on the user device 502. The latency sensitive steps can include steps associate with an emergency stop procedure of the mobile device, where low latency is paramount. The latency sensitive steps can include steps associated with final selection confirmation, to make sure that the direction that is selected, is the actual direction the user wants to go. The latency sensitive steps can also include steps associated with a re-engagement of the same direction procedure, for instance, if the user had already selected to move the mobility device in a certain direction, the system is primed, and only requires processing/confirmation on the user device 502 to make that same directional selection.

The secure cloud, edge or fog node 503 may handle additional model training and personalization, capitalizing on scalable processing power. The secure cloud, edge or fog node 503 may communicate intended navigation commands or other data to the user device 502, which directs an electronic control unit interfacing with mobility device motors and motion controllers to execute the command by performing an operation associated with the command on the mobility device (the operation can be making the mobility device move in a direction). This integration of the low latency processing on the user device 502 and additional processing on the secure cloud, edge or fog node 503, ensures precise and near-instantaneous translation of the user's movement intentions into smooth mobility device maneuverability.

As explained above a key challenge in this domain is decoding speed, and this challenge is not adequately addressed by existing solutions. The disclosure herein addresses this challenge by utilizing signal processing algorithms to implement a machine learning pipeline which improves decoding speed when compared to the prior and current solutions. The signal processing algorithms are embodied as code or instructions stored on a non-transitory computer-readable medium, such as a memory. The pipeline is comprised of an electrical de-noising step/module, a spatial de-noising step/module, a muscle artifacts step/module, an end-to-end neural network step/module, a recalibration model step/module and a hyperparameter fine tuning step/module.

Figure 6:
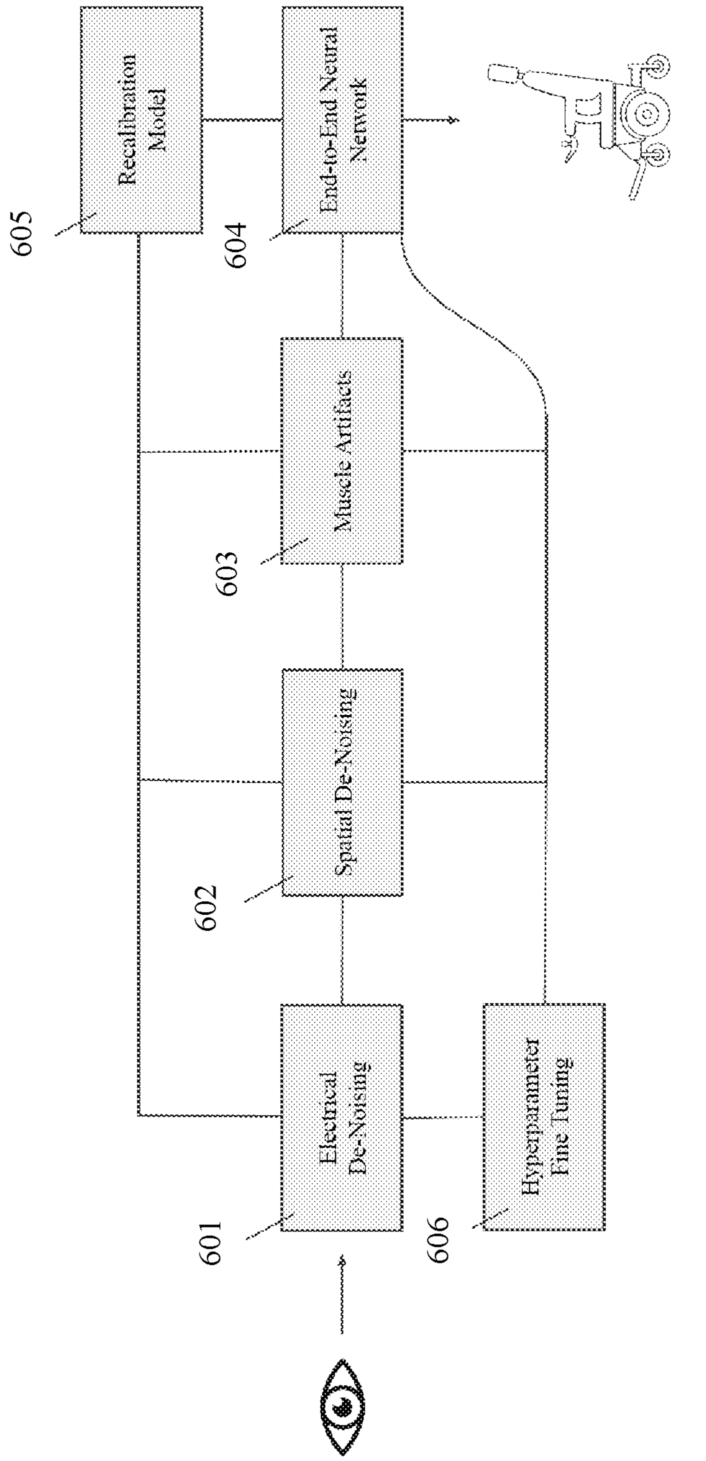
FIG. 6 is a block diagram of a machine learning pipeline in some embodiments of this application.

FIG. 6 is a block diagram of a machine learning pipeline in some embodiments of this application. The machine learning pipeline is comprised of a number of steps, or a number of modules for performing the steps. The modules in this application may be implemented via software, hardware, or a combination of software and hardware. For example, a module may be code stored on a non-transitory computer-readable medium, where that code is executed by a processor to perform the corresponding module function. The modules described or illustrated herein as separate may or may not be physically separate and may be located in a same location, or may be distributed, for example, across a network. For example, some or all of the modules may reside on a user device, some or all of the modules may reside in the cloud, some or all of the modules may reside on edge device(s), some or all of the modules may reside on fog device(s).

Furthermore, modules may be combined, for example, two modules may be combined into a single module. Likewise, the steps in the machine learning pipeline may be combined. The order of the steps and modules in FIG. 6 is merely an example, and a person having ordinary skill in the art would appreciate that the order of the steps or the modules could be changed or that some steps may be executed at the same time. Furthermore, the machine learning pipeline may include additional and different steps not illustrated in FIG. 6. The modules/steps in the machine learning pipeline in FIG. 6 are described below.

Electrical De-Noising 601: Electrical de-noising is the first step in processing EEG brain wave data for controlling operation of the mobility device. This step filters out unwanted electrical noise that can appear in the EEG brain wave data from sources such as power lines, electronic devices, and from other environmental electrical noise. This step employs techniques like notch filtering to eliminate certain frequency bands or frequencies, for example, those associated with power line noise, and band-pass filtering (allowing certain frequencies or frequency bands and attenuating other frequencies) to isolate the EEG brain wave data's relevant frequency ranges. Effective electrical de-noising ensures clean and precise EEG brain wave data, providing a reliable foundation for subsequent processing steps.

Spatial De-Noising 602: Spatial de-noising may follow electrical denoising and aims to refine the EEG brain wave data further by addressing spatial interference. By identifying and isolating the components that correlate with true neural activity from those that are artifacts or noise, spatial de-noising helps in enhancing the spatial resolution of the EEG brain wave data. This is critical for accurately mapping brain activity to specific intentions, such as the desired movement direction of a mobility device. This step uses methods like independent component analysis (ICA) or common average referencing (CAR) to process the brain wave data originating from the various EEG sensors.

Muscle Artifacts 603: Muscle artifacts removal is an essential step for eliminating noise generated by muscle movements, which often contaminates EEG brain wave data. Techniques such as ICA, regression analysis, and wavelet transform are used to detect and remove artifacts caused by muscle activity, including those from facial expressions, eye blinking, and other involuntary movements. By sanitizing these artifacts, the system can focus more accurately on the signals that are pertinent to the user's intent, improving the reliability and precision of this application.

End-to-End Neural Network 604: An end-to-end neural network processes brain wave data captured from the EEG headband and outputs signals used for controlling the mobility device. The end-to-end neural network may be hosted on at least one of the secure cloud, edge or fog node 503 or the user device 502. However, because storing and running the end-to-end neural network uses a lot of computing resources (e.g., processing, memory), the system benefits from hosting the end-to-end neural network on the secure cloud, edge or fog node 503. Large parameter models, like the main end-to-end neural network may be stored on the secure cloud, edge or fog node 503, while lower parameter models, like those relating to safety of the mobility device, may be stored on the user device 502.

The end-to-end neural network consists of multiple interconnected layers that process and interpret the EEG data. The input layer receives time-series data from the EEG sensors placed on the occipital lobe. The subsequent layers, such as convolutional and recurrent layers, extract relevant features and temporal patterns from the EEG brain wave data. These layers learn to identify specific brain wave patterns associated with the user's intended mobility device movements. The extracted features are then passed through the connected layers, which map the learned representations to the corresponding mobility device control commands. The output layer generates the appropriate signals to control the mobility device, enabling translation of the user's brain activity into the desired mobility device operation. The end-to-end nature of the neural network allows for direct mapping between the EEG input and the mobility device control output, minimizing the need for manual feature engineering and promoting automatic adaptability to the individual user's brain patterns.

Recalibration Model 605: The recalibration model is a dynamic component that may interact continuously with the de-noising steps/modules and the end-to-end neural network step/module. This model ensures that the system can adapt to changes in the EEG signal patterns over time, which may occur due to EEG sensor displacement, skin conductivity variations, or other user-specific factors. By periodically recalibrating, the model maintains the system's accuracy and responsiveness, aligning the processed EEG signals with the user's present brain activity. This dynamic adjustment is critical for sustaining effective and reliable control of the mobility device.

Hyperparameter Fine Tuning 606: The hyperparameter fine tuning step is an adaptive mechanism that optimizes the performance of the entire EEG processing pipeline. It continuously adjusts key hyperparameters within the denoising steps and the end-to-end neural network based on real-time feedback of the system's performance. By fine-tuning these hyperparameters, this layer ensures that the model remains robust and responsive to the user's brain activity.

Figure 7:
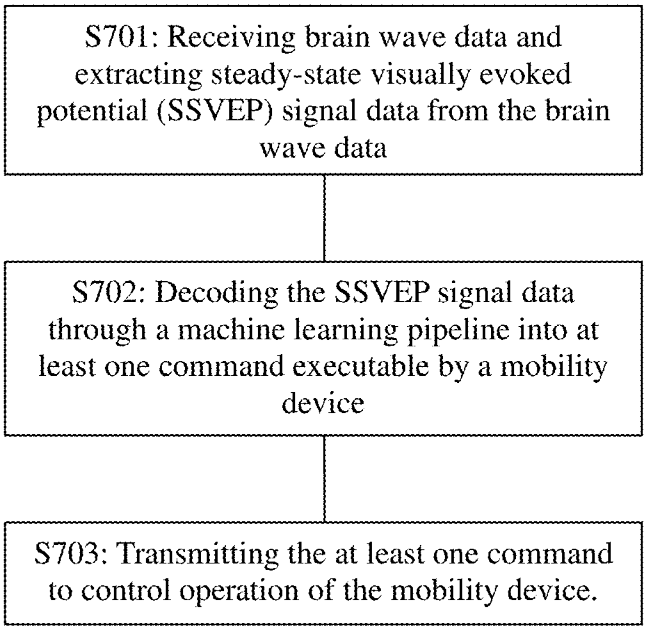
FIG. 7 is flowchart of a method of controlling a mobility device in some embodiments of this application.

FIG. 7 is flowchart of a method of controlling a mobility device in some embodiments of this application. As shown in FIG. 7, the method may include the following steps.

S701: Receiving brain wave data and extracting SSVEP signal data from the brain wave data. A user who wishes to control a mobility device wears an EEG headband, such as the EEG headband 100 in FIGS. 1-3. When worn by the user and activated, the EEG headband receives brain wave data from the occipital lobe of the user's brain, via EEG sensors on the EEG headband positioned at strategic areas of the user's back of the head. SSVEP signals may be triggered by visual stimuli on a screen of a device, such as a user device. The SSVEP signals that are generated correspond to the icon, image, or a portion of the device's screen that the user is looking at. These triggered SSVEP signals are obtained to determine the user's intent (what the user intends that the mobility device do).

S702: Decoding the SSVEP signal data through a machine learning pipeline into at least one command executable by the mobility device. In order to determine the user's intent, the SSVEP signal data is decoded through a machine learning pipeline, which comprises a number of interconnected steps/modules that generate an output command for operating the mobility device based on input data. The steps/modules are described in detail above with regard to FIG. 6.

The machine learning pipeline may be a MoE AI model. The MoE AI model may constantly recalibrate weights and biases (for example, at a rate of 200 times a second), to take into account changing brain activity patterns. The machine learning pipeline includes resource intensive steps/modules and may require cloud, edge and/or fog technology to be utilized for implementing at least part of the machine learning pipeline, as described above with regard to FIG. 5. Offloading heavy processing and storage tasks from the user device, reduces the delay between when the user intends for the mobility device operation to occur and when the mobility device operation actually occurs.

S703: Transmitting the at least one command to control operation of the mobility device. The generated output command is forwarded to the mobility device to make it move in a direction, or perform a function, such as seat tilting, leg and arm rest adjustments, mobility device height alterations, and the like. For example, the user device may transmit the at least one command to the mobility device, or a cloud, edge and/or fog node(s) may transmit the at least one command to the user device where the user device forwards the at least one command to the mobility device.

Figure 8:
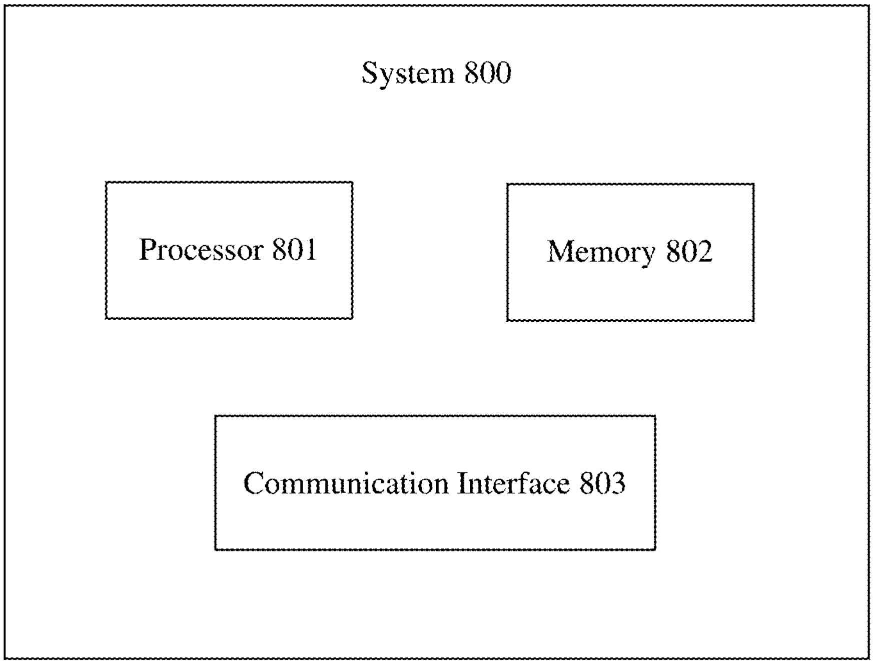
FIG. 8 is an illustration of a generalized apparatus that can be used to perform the methods in some embodiments of this application.

FIG. 8 is a schematic diagram of a system 800 in some embodiments of this application that can be used to perform the methods in this application. The system 800 can represent, for example, a user device, a cloud node, a fog node, an edge node, or any other apparatus or system in this application. The system 800 comprises a processor 801, a memory 802, and a communication interface 803.

The processor 801, may be a central processing unit (CPU), a graphics processing unit (GPU), a digital signal processor (DSP), a neural processing unit (NPU) an application-specific integrated circuit (ASIC), a field programmable gate array (FPGA) or another programmable logic device, a transistor logic device, a hardware component, or the like, or any combination thereof.

The memory 802 may be a random-access memory (RAM), a read-only memory (ROM), a hard disk drive (HDD), a solid-state drive (SSD), or the like. The communications interface 803 is responsible for sending and/or receiving data and can be a network interface card (NIC), a transceiver, or the like.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A method for controlling a mobility device, comprising:
receiving brain wave data and extracting steady-state visually evoked potential (SSVEP) signal data from the brain wave data;
decoding the SSVEP signal data through a machine learning pipeline into at least one command executable by the mobility device, wherein the machine learning pipeline comprises hyperparameter fine tuning, the hyperparameter fine tuning adjusts de-noising hyperparameters based on real-time feedback from the machine learning pipeline, and the de-noising removes noise from the brain wave data; and
transmitting the at least one command to control operation of the mobility device.

2. The method of claim 1, wherein when executed, the at least one command causes the mobility device to move in a direction.

3. The method of claim 1, wherein when executed, the at least one command causes:
an adjustment of a tilt of a mobility device seat,
an adjustment of a height of the mobility device,
an adjustment of a leg rest of the mobility device, or
an adjustment of an arm rest of the mobility device.

4. The method of claim 1, wherein the method further comprises:
saving mobility device configurations; and
accessing the saved mobility device configurations.

5. The method of claim 1, wherein the method further comprises personalizing a main machine learning algorithm based on a user profile, the user profile is dynamically updated with profile information, and the profile information comprises a user's capabilities that are obtained from processing the brain wave data.

6. The method of claim 1, wherein the method further comprises providing feedback in the form of status information of the mobility device, during operation of the mobility device, via a graphical user interface (GUI) of an application.

7. The method of claim 1, wherein the method further comprises wirelessly routing at least some brain wave data to a user device and at least some brain wave data to an edge node.

8. The method of claim 7, wherein the machine learning pipeline comprises a main end-to-end neural network and the main end-to-end neural network is hosted on the edge node.

9. The method of claim 1, wherein the machine learning pipeline comprises a main end-to-end neural network and the main end-to-end neural network is hosted on a fog device.

10. The method according to claim 1, wherein the brain wave data is obtained via electroencephalogram (EEG).

11. The method according to claim 1, wherein the brain wave data is obtained from an EEG headband worn by a user.

12. The method according to claim 11, wherein the EEG headband comprises at least one EEG sensor positioned at an O1, Oz, or O2 location on the user's head.

13. An apparatus for processing brain wave data to operate a mobility device, comprising:

at least one processor for:

decoding steady-state visually evoked potential (SSVEP) signal data extracted from the brain wave data into at least one command through a machine learning pipeline; and transmitting the at least one command, wherein the apparatus is an edge node.

14. The apparatus of claim 13, wherein the transmitted at least one command comprises an instruction for the mobility device to move in a direction.

15. The apparatus of claim 13, wherein the transmitted at least one command comprises an instruction for the mobility device to:

adjust a tilt of the mobility device seat, adjust a height of the mobility device, adjust a leg rest of the mobility device, or adjust an arm rest of the mobility device.

16. The apparatus of claim 13, wherein the at least one processor is configured to personalize a main machine learning algorithm based on a user profile, the user profile is dynamically updated with profile information, and the profile information comprises a user's capabilities that are obtained from processing the brain wave data.

17. At least one non-transitory computer-readable storage medium comprising instructions which when executed by at least one processor cause the at least one processor to:

receive brain wave data and extract steady-state visually evoked potential (SSVEP) signal data from the brain wave data;

decode the SSVEP signal data through a machine learning pipeline into at least one command for operating a mobility device;

personalize a main machine learning algorithm based on a user profile, wherein the user profile is dynamically updated with profile information, and the profile information includes a user's capabilities that are obtained from processing the brain wave data; and transmit the at least one command.

18. The at least one non-transitory computer-readable storage medium of claim 17, wherein the transmitted at least one command comprises an instruction for the mobility device to move in a direction.

19. The at least one non-transitory computer-readable storage medium of claim 17, wherein the transmitted at least one command comprises an instruction for the mobility device to:

adjust a tilt of the mobility device seat, adjust a height of the mobility device, adjust a leg rest of the mobility device, or adjust an arm rest of the mobility device.

20. The at least one non-transitory computer-readable storage medium of claim 17, wherein the brain wave data is obtained via electroencephalogram (EEG).

* * * * *